(12) United States Patent
Zeng

(10) Patent No.: US 9,069,075 B2
(45) Date of Patent: Jun. 30, 2015

(54) COUPLED RANGE AND INTENSITY IMAGING FOR MOTION ESTIMATION

(75) Inventor: Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 515 days.

(21) Appl. No.: 13/370,685

(22) Filed: Feb. 10, 2012

(65) Prior Publication Data

US 2013/0211657 A1 Aug. 15, 2013

(51) Int. Cl.
| | | |
|---|---|---|
| *G06F 17/00* | (2006.01) | |
| *G01S 17/58* | (2006.01) | |
| *G01S 17/89* | (2006.01) | |
| *G01S 17/93* | (2006.01) | |
| *G08G 1/16* | (2006.01) | |
| *G06T 7/20* | (2006.01) | |

(52) U.S. Cl.
CPC .............. *G01S 17/58* (2013.01); *G01S 17/89* (2013.01); *G01S 17/936* (2013.01); *G08G 1/16* (2013.01); *G08G 1/166* (2013.01); *G06T 7/2066* (2013.01); *G06T 2207/10016* (2013.01); *G06T 2207/10028* (2013.01); *G06T 2207/30261* (2013.01)

(58) Field of Classification Search
CPC ....... G01S 17/02; G01S 17/10; G01S 17/107; G01S 17/36; G01S 17/58; G01S 17/93; G01S 17/936; G08G 1/16; G08G 1/166
USPC .................. 701/300, 301; 348/139, 169, 170; 356/4.01; 340/435, 436
See application file for complete search history.

(56) References Cited

U.S. PATENT DOCUMENTS

| | | | | |
|---|---|---|---|---|
| 4,054,906 | A | | 10/1977 | Yamanaka |
| 6,480,615 | B1 | * | 11/2002 | Sun et al. ................... 382/103 |
| 7,130,745 | B2 | * | 10/2006 | Sherony ....................... 701/301 |
| 7,262,710 | B2 | * | 8/2007 | Watanabe et al. ............ 340/903 |
| 7,358,473 | B2 | * | 4/2008 | Aoki et al. ................... 250/205 |
| 7,375,803 | B1 | | 5/2008 | Bamji |
| 7,639,874 | B2 | * | 12/2009 | Bushell et al. ............... 382/173 |
| 7,684,590 | B2 | * | 3/2010 | Kampchen et al. .......... 382/103 |
| 8,095,313 | B1 | * | 1/2012 | Blackburn .................... 701/301 |
| 8,400,511 | B2 | * | 3/2013 | Wood et al. .................. 348/164 |
| 8,648,702 | B2 | * | 2/2014 | Pala .............................. 340/435 |
| 2006/0111841 | A1 | * | 5/2006 | Tseng ........................... 701/301 |
| 2007/0247517 | A1 | * | 10/2007 | Zhang et al. ................... 348/30 |

(Continued)

OTHER PUBLICATIONS

S. Hussmann, T. Ringbeck and B. Hagebeuker (2008). A Performance Review of 3D TOF Vision Systems in Comparison to Stereo Vision Systems, Stereo Vision, A. Bhatti (Ed.), ISBN: 978-953-7619-22-0, InTech.*

(Continued)

*Primary Examiner* — Thomas G Black
*Assistant Examiner* — Peter D Nolan
(74) *Attorney, Agent, or Firm* — Mark S. Cohen; Pearl Cohen Zedek Latzer Baratz LLP

(57) ABSTRACT

A method and system may operate a coupled range imager and intensity imager to obtain a sequence of at least two automatically registered images, each automatically registered image including concurrently acquired range data and intensity data with regard to an imaged scene. The registered range and intensity data is analyzed to yield an estimated motion of an element of an imaged object of the imaged scene.

4 Claims, 5 Drawing Sheets

(56) References Cited

U.S. PATENT DOCUMENTS

| | | | |
|---|---|---|---|
| 2008/0059069 A1* | 3/2008 | Trutna | 701/301 |
| 2009/0080702 A1* | 3/2009 | Ma et al. | 382/103 |
| 2010/0053592 A1* | 3/2010 | Yahav et al. | 356/4.01 |
| 2010/0315505 A1* | 12/2010 | Michalke et al. | |
| 2011/0304842 A1* | 12/2011 | Kao et al. | 356/5.01 |

OTHER PUBLICATIONS

S. Ghobadi, O. Loepprich, O. Lottner, K. Hartmann, W. Weihs and O. Loffeld. 2D/3D Image Data Analysis for Object Tracking and Classification, in Advances in Machine Learning and Data Analysis, vol. 48, 2010.*

M. Schmidt, M. Jehle and B Jahne, "Range Flow Estimation based on Photonic Mixing Device Data," International Journal of Intelligent Systems Technologies and Applications 5.3 (2008): 380-392.*

Chiabrando et al., "Sensors for 3D Imaging: Metric Evaluation and Calibration of a CCD/CMOS Time-of-Flight Camera," Sensors 2009, 9, 10080-10096; doi: 10.3390/s91210080.

Ringbeck et al., "A 3D Time of Flight Camera for Object Detection," Optical 3-D Measurement Techniques 9, Jul. 12, 2007.

A Performance Review of 3D TOF Vision Systems in Comparison to Stereo Vision Systems, Stephan Hussmann et al, stereo vision, pp. 103-104 and 114-116, 2008.

2D/3D Image Data Analysis for Object Tracking and Classification, Seyed Eghbal Ghobadi et al, Machine Learning and Data Analysis, p. 2-3 in Chapter 1.2 and pp. 4-5 in Chapter 1.2.2.1, 2010.

* cited by examiner

COUPLED RANGE AND INTENSITY IMAGING FOR MOTION ESTIMATION

The present invention is related to determining locations and relative velocities of objects.

BACKGROUND OF THE INVENTION

A vehicle may be equipped with a system or device to semi-autonomously or autonomously control the vehicle so as to maintain a relative position in a roadway and to avoid collision with objects or structures. Such a system may involve use of various sensors for detecting the locations of structures or objects such as edges of the roadway and other objects. For example, various sensors may be operated to detect distances to objects and a distribution of intensity of radiation that is reflected from the objects.

SUMMARY OF THE INVENTION

A coupled range imager and intensity imager may be operated to obtain a sequence of at least two automatically registered images, each automatically registered image including concurrently acquired range data and intensity data with regard to an imaged scene. The registered range and intensity data may be analyzed to yield or produce an estimated motion of an element of an imaged object of the imaged scene.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
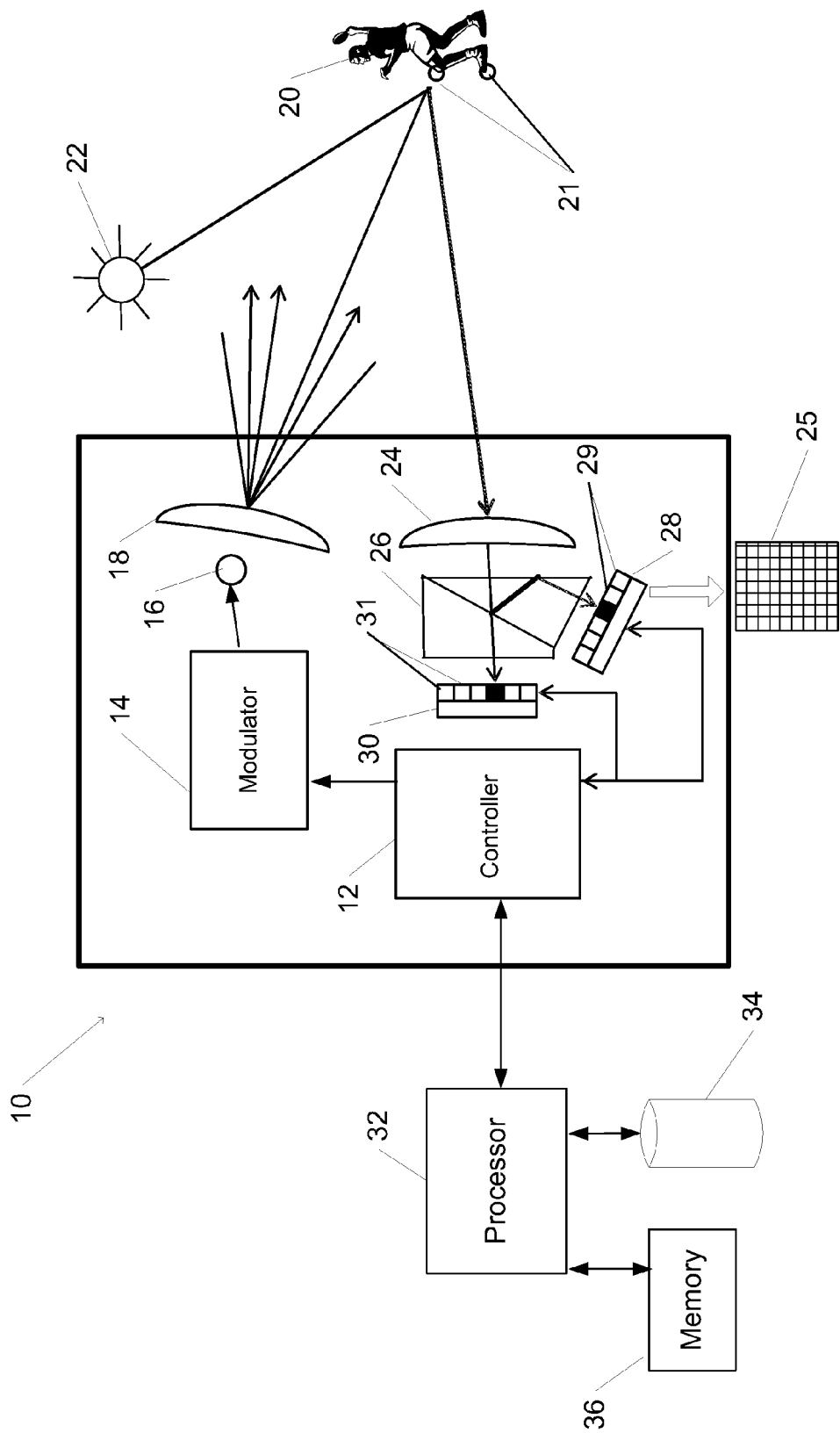
FIG. 1 is a schematic diagram of a system with a coupled range imager and intensity imager, in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with an embodiment of the invention, a system may include a range imager and an intensity imager that are optically coupled and are operated in a coupled manner. For example, a coupled range imager and an intensity imager may be incorporated into or associated with autonomous driving control system of a vehicle. (In some embodiments an autonomous driving control system need not be used). Such coupling may be referred to as tight coupling since there is physical coupling (e.g. mechanical—both are attached to one another, optical—images formed by both have a constant relationship to one another, and electronic—a single set of electronics operates both) of the range and intensity imager devices. For example, both the range imager and the intensity imager may share imaging optics that focuses incoming radiation on detectors of both the range and intensity imagers. For example, the incoming radiation may pass via a beam splitter that directs part of the incoming radiation to a detector of the range imager, and part to a detector of the intensity imager. Similarly, image acquisition in both the range and intensity imagers may be synchronized (e.g. initiated by a common trigger signal). In this manner, there may be automatically known (e.g. without image analysis of the acquired images) temporal and spatial relationship (or registration) between a range image that is acquired via the range imager and an intensity image that is acquired via the intensity imager. This automatically known temporal and spatial relationship may be referred to as automatic registration.

Thus, image data from both imagers may be combined into a single automatically registered image. The range and intensity data may be actually combined, e.g. by incorporation into a single data structure, or may be treated as a single set of data by utilizing known correlations between pixels of the range and intensity images. Thus, synchronized operation of range imager and the intensity imager may enable obtaining an automatically registered image. Repeated synchronized operation two or more times may enable obtaining a sequence of at least two automatically registered images.

Analysis of the automatically registered image may yield or produce three dimensional location information of an imaged object. Analysis of successively acquired images may yield (e.g. via application of an optical flow technique) information regarding motion of an imaged object relative to a platform (e.g. a vehicle) with which the range and intensity imagers are associated (e.g. mounted on, carried by, or attached to).

Automatic registration may be enabled by a known temporal and spatial relationship that results from physical coupling of the range and intensity imagers. On the other hand, in the absence of such physical coupling (e.g. as in some prior art systems), the imagers may be loosely coupled. For example, with prior art loose coupling systems, a range imager and intensity imager would be aimed at a single object but each imager would have separate imaging optics and with image acquisition being triggered by a separated trigger signal. Image acquisition would thus be only approximately synchronized by a common clock. In such a prior art system, objects in acquired images could be registered by application of image processing techniques. Application of such image processing techniques could introduce inaccuracy into the registration (especially, e.g., when an imaged scene is cluttered). Such application of image processing techniques could be more time consuming than automatic registration resulting from physical coupling of range and intensity imagers in accordance with an embodiment of the invention.

FIG. 1 is a schematic diagram of a system with a coupled range imager and intensity imager, in accordance with an embodiment of the invention. Coupled range imager and intensity imager device 10 may, for example, be incorporated in an autonomous driving system of a vehicle. Coupled range imager and intensity imager device 10 may include controller 12. Controller 12 may include one or more controller devices for controlling one or more components of coupled range imager and intensity imager device 10. Controller 12 may operate as determined by incorporated circuitry, may operate in accordance with programmed instructions, or may operate in accordance with a combination of the above.

Controller 12 may be incorporated into, or may communicate with, processor 32, or may operate independently of processor 32. For example, processor 32 may be incorporated into an autonomous driving system of a vehicle, or may be a separate processor. Processor 32 may include a plurality of intercommunicating processing devices. Processor 32 may operate in accordance with programmed instructions.

Processor 32 may communicate with, or be associated with, data storage device 34. Processor 32 may include, for example, a central processing unit (CPU), a chip or any suitable computing or computational device. Processor 32 may include multiple processors, and may include general-purpose processors and/or dedicated processors such as graphics processing chips. Processor 32 may execute code or instructions, for example, stored in memory 36 or data storage device 34, to carry out embodiments of the present invention.

Memory 36 may be or may include, for example, a random access memory (RAM), a read only memory (ROM), a dynamic RAM (DRAM), a synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 36 may be or may include multiple memory units.

Data storage device 34 may be or may include, for example, a hard disk drive, a floppy disk drive, a compact disk (CD) drive, a CD-recordable (CD-R) drive, a universal serial bus (USB) device or other suitable removable and/or fixed storage unit, and may include multiple or a combination of such units. For example, data storage device 34 may be operated to store programming instructions for operation of processor 32 or controller 12, may be used to store data that is acquired by coupled range imager and intensity imager device 10, or may be used to store data or parameters that may be utilized or generated during operation of processor 32 or controller 12. Processor 32 may communicate with, or be associated with, memory device 36. Memory device 36 may include one or more volatile or non-volatile memory devices to which data may be stored, and from which data may be read, during operation of processor 32 or of controller 12.

For example, controller 12 may control operation of components of coupled range imager and intensity imager device 10 such as modulator 14, range imager detector 28, and intensity imager detector 30. Controlling operation of modulator 14, range imager detector 28, and intensity imager detector 30 may enable acquisition of an automatically registered range-intensity image.

Controller 12 may control a light emitter that includes a light source 16 whose operation is controlled by modulator 14. For example, light source 16 may include a laser diode or light emitting diode (LED) that is capable of emitting radiation of a known wavelength (or set or range of wavelengths). Light source 16 may include several identical or different light sources. Modulator 14 may control light source 16 to emit pulses of light (herein referring to any suitable electromagnetic radiation such as infrared or near infrared radiation, and not necessarily visible radiation), or to emit light with a predetermined time varying pattern, such as an intensity pattern or a varying wavelength pattern.

The emitted radiation may be directed by emitter optics 18 toward a scene. For example, emitter optics 18 may include one or more lenses, mirrors, prisms, apertures, or other optical components for redirecting at least part of the light that is emitted by light source 16 toward the scene in the form of a beam, fan, or cone of light. For example, emitter optics 18 may include stationary components, or may include one or more movable components. Movable components may be controlled, e.g. by controller 12, to scan a beam of light across a scene so as to illuminate multiple regions of the scene. The scene may include an object 20. Light emitted from light source 16 may be reflected by various points on object 20 toward collecting optics 24.

Similarly, light from ambient source 22 (e.g. direct or reflected natural light from the sun or from the sky, or ambient artificial illumination such as from street lamps or from vehicle headlights, or from a steady or intermittent light source associated with coupled range imager and intensity imager device 10) may be reflected from object 20 toward collecting optics 24. For example, light from ambient source 22 may be polychromatic (e.g. substantially white). Thus, the spectrum of light that originates from ambient source 22 and is reflected from object 20 may be colored in accordance with a surface color of object 20.

Light that is incident on collecting optics 24 may be focused and directed toward beam splitter 26. For example, collecting optics 24 may include one or more lenses, mirrors, prisms, apertures, or other optical components for directing at least some of the light that is incident from a scene, such as a scene that includes object 20, toward beam splitter 26

Beam splitter 26 may direct some of the incident light toward range imager detector 28, and some toward intensity imager detector 30. For example, beam splitter 26 may include a selective mirror or filter that directs light in the spectral range of light that is emitted by light source 16 toward range imager detector 28. As another example, light may be divided between range imager detector 28 and intensity imager detector 30 using another type of beam splitting technique that is not spectrally selective. For example, beam splitter 26 may include a partially reflective or transmissive surface such as partially silvered mirror, a prism, a filter, or other similar component.

Due to the focusing of collecting optics 24, an image of the scene, including an image of object 20, may be imaged simultaneously on both range imager detector 28 and intensity imager detector 30. Controller 12 may then operate range imager detector 28 and intensity imager detector 30 to acquire range and intensity images concurrently.

For example, controller 12 may control range imager pixels 29 of range imager detector 28 to detect incident light in a manner that is synchronized with emission of light by light source 16. For example, electronics or circuitry that is associated with or incorporated into range imager pixels 29 may be configured to measure a time of flight of a light pulse from light source 16 to a range imager pixel 29. In this manner, a range (e.g., distance) to each imaged point (e.g. imaged points 21) of object 20 from coupled range imager and intensity imager device 10 may be calculated. A two-dimensional array 25 of calculated ranges of points, or a range image, may be saved, e.g. in memory 36 or on data storage device 32. For example, range imager detector 28 may include a Photonic Mixer Device (PMD) time-of-flight camera of the type manufactured by PMD Technologies.

Concurrently with, or substantially at the same time as, acquisition of a range image, controller 12 may control intensity imager detector 30 to acquire an intensity image of the imaged scene, including object 20. For example, intensity imager pixels 31 of intensity imager detector 30 may include arrays of charge coupled device (CCD) detectors or of complementary metal-oxide-semiconductor (CMOS) detectors, or other types of imagers. Each detector may produce a signal that indicates the intensity of radiation that is incident on that detector, thus determining the brightness of a corresponding pixel of a resulting image. Such an array of detectors may include a color separation mechanism (e.g. an array of colored filters) so as to produce a color image. For example, the detector array may produce a three-color red-green-blue (RGB) image. Thus, imaged objects may be distinguished from one another by their surface colors, as well as by their positions. An acquired image may be saved, e.g., in memory 36 or on data storage device 32.

As a result of the sharing of the optics and the synchronization of the image acquisition, the acquired range and intensity images are automatically aligned. Thus, radiation that is reflected from an element of the imaged object that is at a known angular position relative to an optical axis of collecting optics 24 may always be focused to the same pair of a range imager pixel 29 and a corresponding intensity imager pixel 31. A map, table, functional relationship, or other correspondence that correlates each range imager pixel 29 to its corresponding intensity imager pixel 31 may be constructed. For example, such a correspondence may be measured or constructed during a calibration procedure that is performed on a system during manufacture or maintenance of a coupled range imager and intensity imager device 10, or on a prototype of a coupled range imager and intensity imager device 10 during a design or development phase of a product line.

The acquired range images and intensity images may be combined into a single range-intensity image. Thus, each point (e.g., pixel) of the range-intensity image may be characterized by four values that characterize a corresponding point or region of the imaged object 20: a range to the point of the object (one value) and an intensity of reflected light in each RGB color channel (three values). Other types of intensity data (e.g. using an alternative set of color channels, or a monochromatic image) may be used. Other numbers of values may be used.

Differences between images made at successive times may be analyzed to yield or produce a motion or estimated motion of each imaged object (or point of the object) relative to coupled range imager and intensity imager device 10. The resulting motion may, for example, be used as a basis of controlling a vehicle to avoid colliding with the imaged object.

Figure 2:
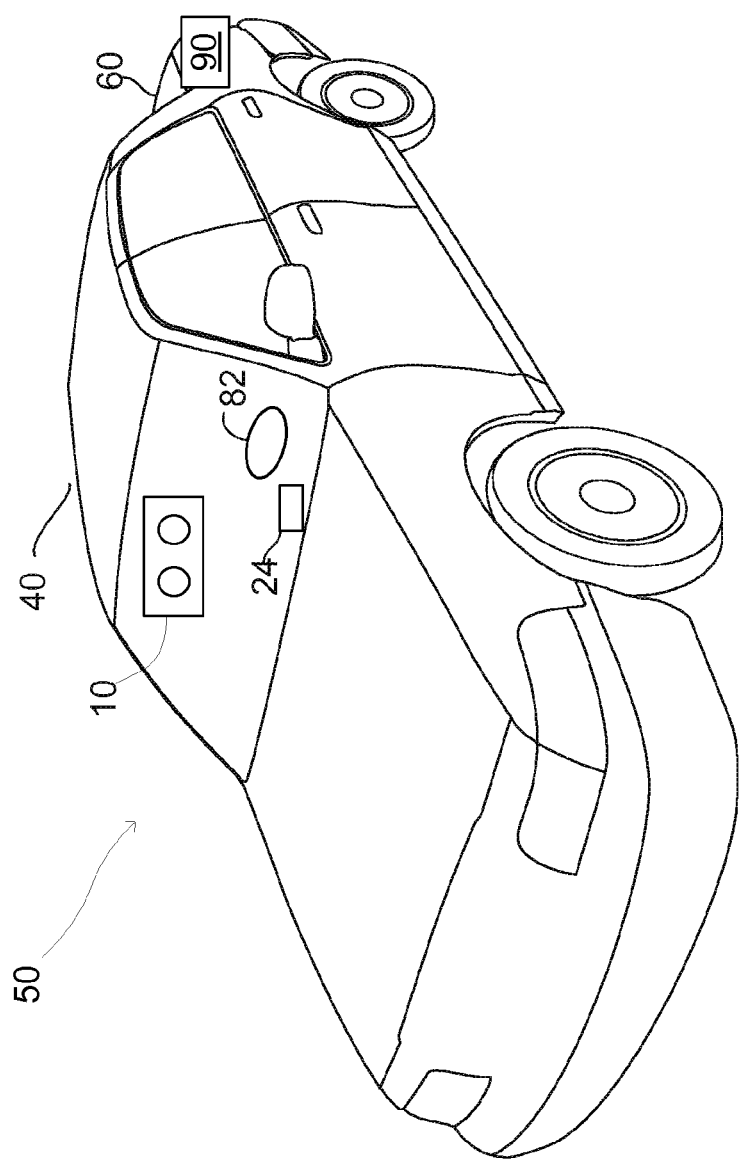
FIG. 2 schematically shows a vehicle that incorporates a system with a coupled range imager and intensity imager, in accordance with an embodiment of the present invention.

FIG. 2 schematically shows a vehicle that incorporates a system with a coupled range imager and intensity imager, in accordance with an embodiment of the invention.

A vehicle or host vehicle 50 (e.g., a truck, SUV, bus, car, motorized cart, or another vehicle) may include a coupled range imager and intensity imager device 10. Coupled range imager and intensity imager device 10 may operate in conjunction with, or separate from, one or more automatic vehicle control systems, autonomous driving applications, or vehicle automated control systems 90. Vehicle automated control system 90 may, for example, be an automated steering system or an automated braking system. Vehicle automated control systems 90 may, when engaged, fully or partially control the steering or braking of the vehicle, or alter or reduce driver (e.g. operator of vehicle 50) steering control input via steering wheel 82 or brake control 24 (e.g. a brake pedal or hand brake).

One or more sensors may be attached to or associated with the vehicle 50. In one embodiment of the present invention, vehicle 50 may include one or more devices or sensors to measure vehicle steering input, vehicle steering conditions, vehicle steering parameters, vehicle dynamics, driver input, or other vehicle related conditions or measurements. The vehicle dynamics measurement devices may include one or more steering angle sensors (e.g., connected to steering wheel 82 or another component of the steering system). The vehicle dynamics measurement devices may also include an accelerometer, speedometer, wheel speed sensor, inertial measurement unit (IMU), gear shift position sensors, gas pedal position sensor, brake pedal position sensor, or other or different devices.

The vehicle dynamics measurement devices may measure driver input or vehicle dynamics parameters including lateral (e.g., angular or centripetal) acceleration, longitudinal acceleration, vertical acceleration, steering torque, steering direction, steering wheel angle, yaw-rate, lateral and longitudinal velocity, wheel rotation velocity and acceleration, and other vehicle dynamics characteristics of vehicle 50. The vehicle dynamics measurement device(s) may also measure vertical forces on each of at least one of the tires of vehicle 50. The measured vehicle dynamics, vehicle conditions, steering measurements, steering conditions, or driver input information may be sent or transferred to vehicle automated control system 90 via, for example, a wire link (e.g., a controller area network (CAN) bus, Flexray bus, Ethernet cable) or a wireless link. The measured vehicle dynamics, vehicle conditions, or driver input information data may be used by vehicle automated control system 90 or another system to determine a current risk or likelihood of a collision, and to calculate a desired operation of vehicle 50 so as to minimize the possibility or likelihood of a collision. While certain vehicle dynamics measurement devices and vehicle automated control system are discussed herein, other types of such systems may be used. In addition, a coupled range imager and intensity imager device as disclosed herein need not be used with a vehicle automated control system.

In one embodiment of the present invention, vehicle automated control system 90 may include or be included in a computing device mounted on the dashboard of the vehicle, in passenger compartment 40 (or cab), or in cargo area 60 (e.g. a trunk). In alternate embodiments, vehicle automated control system 90 may be located in another part of vehicle 50, may be located in multiple parts of vehicle 50, or may have all or part of its functionality remotely located (e.g., in a remote server or in a portable computing device such as a cellular telephone). A coupled range imager and a vehicle automated control system may have all or part of its functionality performed by the same device(s), e.g., controller 12, processor 32, memory 36, and/or data storage device 34, or other devices.

While various sensors and inputs are discussed, in some embodiments only a subset (e.g. one) type of sensor or input may be used.

Figure 3:
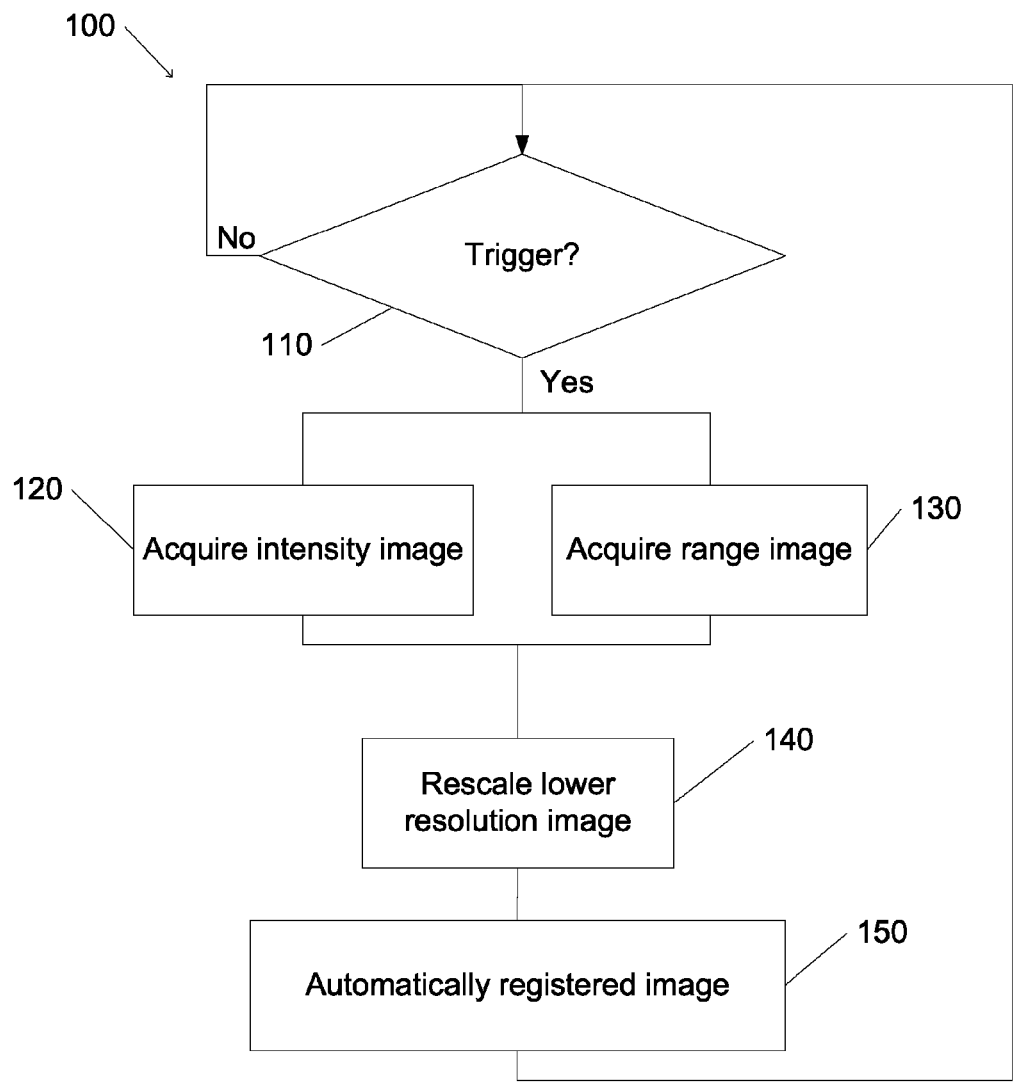
FIG. 3 is a flowchart of a method for operation of a coupled range imager and intensity imager device in accordance with an embodiment of the present invention.

FIG. 3 is a flowchart of an example of a method for operation of a coupled range imager and intensity imager device in accordance with an embodiment of the invention. Coupled range imager and intensity imager operation method 100 may be implemented by a processor or controller that is associated with a coupled range imager and intensity device, e.g. of a vehicle. For example, coupled range imager and intensity imager operation method 100 may be performed periodically, e.g. at predetermined time intervals or at time intervals that are determined in accordance with sensed conditions (e.g. vehicle speed, road curvature, or environmental conditions).

It should be understood with respect to this flowchart and with respect to all flowcharts referred to herein, that the division of the illustrated method into separate operations indicated by separate blocks has been selected for convenience and clarity only. The illustrated method could be divided in an alternative manner with equivalent results. All such alternative division of the method into operations should be considered as falling within the scope of embodiments of the invention. Similarly, unless indicated otherwise, the blocks and the represented operations are shown in an order that is selected for convenience and clarity only. Unless indicated otherwise, illustrated operations of the illustrated method could be performed in alternate order or concurrently with equivalent results. All such reordering of blocks of the flowchart and the corresponding operations should be considered as falling within the scope of embodiments of the invention.

In performing coupled range imager and intensity imager operation method 100, a trigger signal may be waited for (block 110). For example, a trigger signal may be generated and/or sent by a controller at predetermined intervals. The intervals at which successive trigger signals are generated may be determined in accordance with requirements (e.g. of an autonomous driving system of a vehicle, e.g. in order to detect an object in time to avoid a collision between the vehicle and the object, or in order to minimize differences between successively acquired images), in accordance with capabilities of the system (e.g. a time required for acquiring and reading out range and intensity data), or in accordance with a combination of the above or any other factors.

When a trigger signal is detected, an intensity image or intensity data may be acquired (block 120). For example, a CCD readout circuit may be operated to obtain readouts of accumulated charges in each CCD pixel of a CCD array. The readouts may be converted to one or more intensity maps of the imaged scene. For example, the readouts may be converted to an RGB representation of the imaged scene.

Also upon detection of a trigger signal, a range image or range data may be acquired (block 130). The range image or data may be acquired concurrently or substantially simultaneously with acquisition of the intensity image or intensity data. For example, the trigger signal may cause a modulator of the range imager to control a light source to emit a pulse of light. Concurrently, a readout circuit may be operated to obtain a time of flight between emission and detection of the pulse by each pixel of the range imager. For example, a voltage generated by the readout circuit may be indicative of, and may be converted to, a time of flight of the pulse from the light source of the range imager, to a point on an imaged object, and back to the detector of the range imager. The time of flight may be multiplied by the speed of light to yield or produce a roundtrip distance between the range imager and the point from which the pulse was reflected. The roundtrip distance may be divided by two to yield or produce a range of the imaged point.

Figure 4:
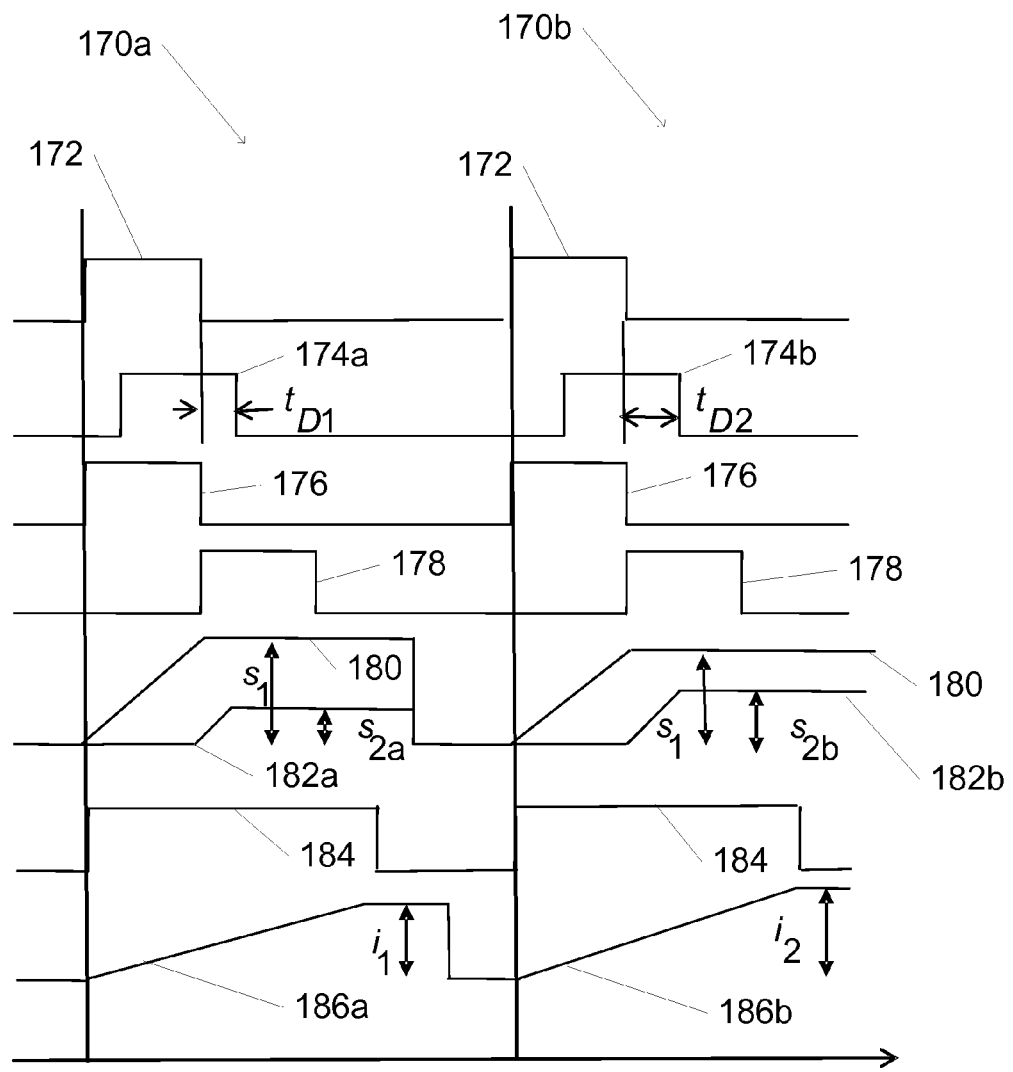
FIG. 4 illustrates coordinated acquisition of pixels of a range and intensity image in accordance with an embodiment of the present invention.

FIG. 4 illustrates coordinated acquisition of pixels of a range and intensity image in accordance with an embodiment of the invention. Two measurement cycles, measurement cycle 170a and measurement cycle 170b may represent two sequential concurrent or substantially simultaneous measurements of a single range imager pixel and of a single intensity imager pixel, or concurrent or substantially simultaneous measurements of different pixels. A transmitted signal 172 is triggered by gating signal 176, indicating a transmitted pulse of radiation. The transmitted signal 172 may be integrated to yield or produce integrated transmitted signal 180 (with signal voltage $s_1$). If radiation of the transmitted pulse is reflected from an object element back toward the collecting optics of the system, a received signal 174a or 174b may be received by a pixel of the range imager detector. The measured time delay $t_{D1}$ or $t_{D2}$ of the received signal may be related to a distance to the object element from the system. Integration of the received signal, triggered by gating signal 178, may yield or produce an integrated received signal 182a or 182b (with signal voltages $s_{2a}$ and $s_{2b}$, respectively). The maximum voltage of integrated received signal 182a or 182b may thus be proportional to measured time delay $t_{D1}$ or $t_{D2}$ of the received signal. Thus, a time of flight, or, equivalently, a measured range, measured during measurement cycle 170a may be determined from a calculated difference between signal voltage $s_1$ and signal voltage $s_{2a}$. Similarly, a measured range measured during measurement cycle 170b may be determined from a calculated difference between signal voltage $s_1$ and signal voltage $s_{2b}$.

Measurement of an integrated intensity signal 186a or 186b may be gated by gating signal 184. The intensity signal voltages $i_1$ and $i_2$ may be indicative of an intensity of ambient light that is reflected by an element of the imaged object and imaged on the detector of the intensity imager. Integrated intensity signals 186a and 186b may represent a brightness measurement (e.g. to form a grayscale image), or may represent measurement of intensity of a particular color signal (e.g. of an RGB imaging system). Multiple integrated intensity signals 186a or 186b may, in some embodiments, be measured. For example, red, green, and blue; or any other combination of intensity signals 186a or 186b may be measured.

Pixel spacing in the detector of the intensity imager may differ from pixel spacing in the detector of the range imager. Thus, the resolution of the resulting raw intensity images and the range images may differ. For example, reading out the range image may be more time consuming than reading out the intensity image. In addition, circuitry for reading out the range image may be more complex than circuitry for reading out the intensity image. Therefore, resolution of the range image may be lower (more widely spaced pixels) than resolution of the intensity image. Other differences between the systems used may exist in some embodiments, and the differences noted here may be reversed, all or in part.

Referring again to FIG. 3, the image with the lower resolution, e.g. the range image, may be rescaled to yield or produce the same resolution as the image with the higher resolution, e.g. the intensity image (block 140). For example, an interpolation technique may be applied to pixels of the range image to calculate interpolated ranges at intermediate positions (between existing range measurements) that correspond to pixels of the intensity image. As a result of the rescaling, each pixel of the intensity image, representing a point on the imaged object, corresponds to a pixel of the range image, representing a range of that point of the imaged object.

In the event that both images have equal resolution, rescaling may have no effect (the rescaled image being identical to the image prior to rescaling). In such a case, the operation indicated by block 140 may be omitted.

After any rescaling of the lower resolution image, the two images may be combined into an automatically registered image (block 150). Each pixel of the automatically registered image may, for example, be characterized by a range and by an intensity-related value (e.g. gray scale or RGB) or values (e.g., a red, blue, and green value).

A sequence of successively acquired automatically registered images may be obtained and analyzed to yield, produce, or determine a motion or estimated motion of an imaged object. For example, analysis of the motion of the object may be used by an autonomous driving system in order to control operation of a vehicle to avoid colliding with the object. As another example, a driver assistance application may warn a driver of the vehicle of a possible collision with the object, enabling the driver to adjust control of the vehicle so as to prevent the collision.

Figure 5:
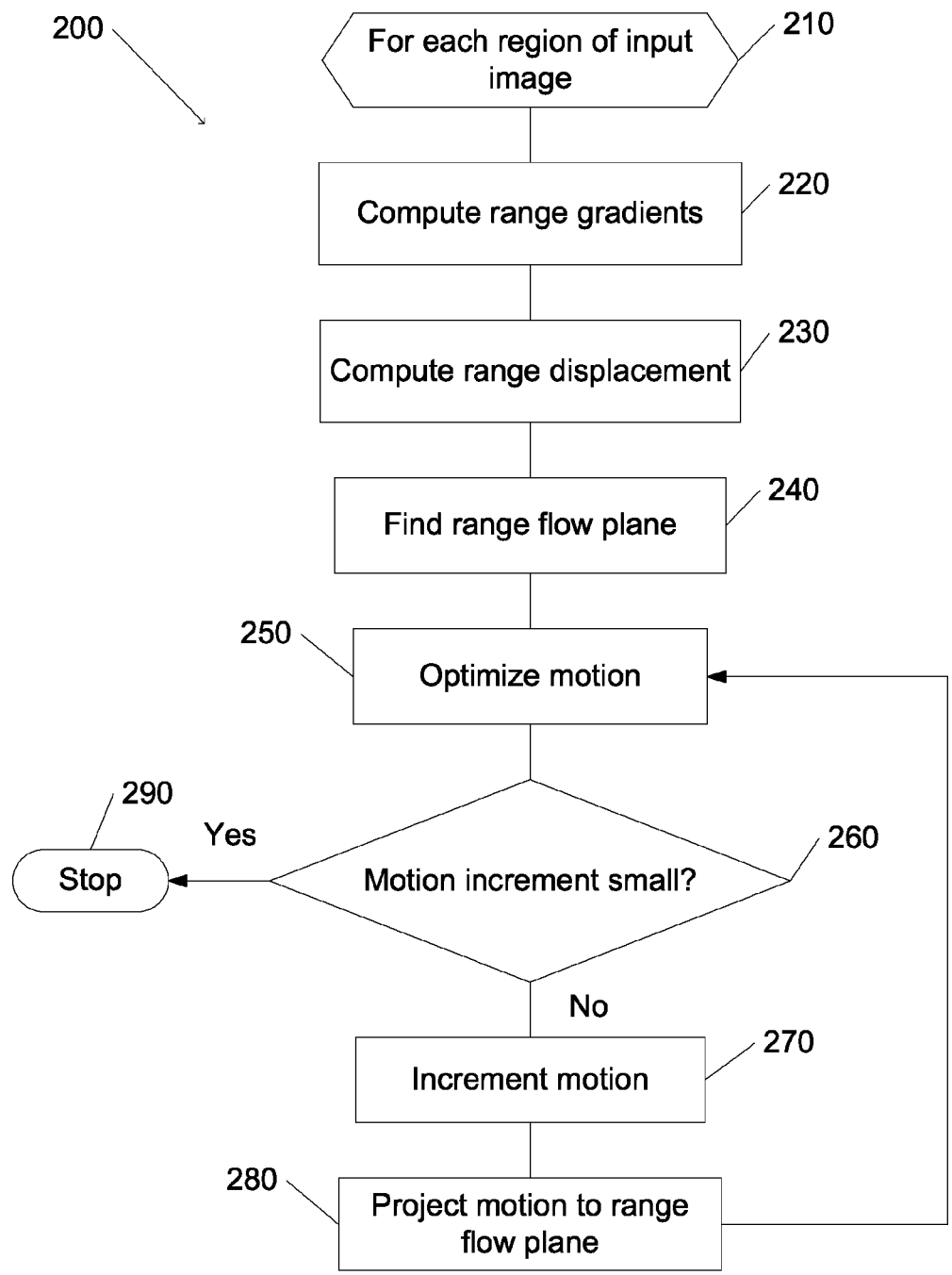
FIG. 5 is a flowchart of a method for motion estimation in accordance with an embodiment of the present invention.

The combination of intensity (or color) information and range information in the automatically registered image may expedite analysis of data so as to unambiguously determine velocities of motions of imaged objects. For example, analysis of intensity or color information may enable identifying an imaged object in successively acquired images. Analysis of the corresponding successively acquired range information may yield or produce a change in distance of the object. Similarly, knowledge of a range of each element of an image object may enable unambiguous conversion of separations in the image to lateral distances between objects or elements of objects. The estimated distances and velocities may be utilized for example, in cont FIG. 5 is a flowchart of a method for motion estimation in accordance with an embodiment of the invention.

For example, two frames (each including three-dimensional data derived from automatically aligned range and intensity images) may be acquired successively. The previously acquired frame may be referred as a template image T(u), and a newly acquired frame may be referred to as an input image I(u), where u=(u,v) refer to image row and column coordinates of a pixel.

Estimating a velocity of an object (or element of an object) may be described as calculating a three-dimensional displacement p=(U,V,W) of a continuous region of surface of the object along the X, Y, and Z axes, respectively. The Z axis describes a distance (range) of the region, and X and Y describe lateral distances (e.g. with respect to an optical axis of the collection optics of the system). Properly deriving the motion from the pair of frames may include automatically determining which region or patch of the input image corresponds to a given patch of the template image (e.g. represents images of the same object element but displaced). Motion estimation method 200 may be performed for each patch (local region) of the input image (block 210).

Based on the three-dimensional information in the images, gradients $\partial_u Z$ and $\partial_u Z$ may be calculated (block 220). Similarly, a displacement in time $\Delta_t Z$ of the range (quantified by Z) of the patch between the template image and the input image may be calculated (block 230).

The calculated gradients and displacement of the range may be used to define or create a range flow plane (block 240). For example, the depth of a point a in a patch may be expressed as range flow plane, may be expressed in homogenous form as (as a function of time):

$$Z(X,Y,t) = Z_0(t) + \partial_X Z \cdot X(t) + \partial_Y Z \cdot Y(t)$$

This may be differentiated to yield or produce an expression of the range flow plane in homogeneous form (expressed in pixel coordinates):

$$\frac{\partial_u Z}{\partial_u X} U + \frac{\partial_v Z}{\partial_v Y} V - \Delta_t Z + W = 0$$

or as $$\left[ \frac{\partial_u Z}{\partial_u X} \quad \frac{\partial_v Z}{\partial_v Y} \quad 1 \quad \Delta_t Z \right]$$

The range flow plane may constrain the velocities such that the results are self-consistent. The constraint may be expressed as:

$$\left[ \frac{\partial_u Z}{\partial_u X} \quad \frac{\partial_v Z}{\partial_v Y} \quad 1 \right] p^T = \Delta_t Z$$

An optical flow technique, constrained in accordance with the range flow plane, may be applied in order to find an optimal set of displacements (or velocities) p=(U,V,W). (At the beginning of the process, values of p may be initialized, e.g. to 0 or to a value that described a motion of a previously analyzed neighboring patch.) For example, flow estimation may yield or produce a warp function R(u,p) describing a motion of image elements between T and I such that I(R(u,p)) matches T(u) as closely as possible. The difference between I(R(u,p)) and T(u) may be quantized by the cost function $$\sum_u [I(R(u, p + \Delta p)) - T(u)]^2$$

where $\Delta p$ is a change in p from a previously calculated or initialized value.

An optimal set of displacements may be found using an iterative technique (e.g., cycling through or repeating sets of operations such as blocks 250 through 280).

The motion may be optimized (block 250). For example, a least squares representation may be solved to yield or produce an optimal value of $\Delta p^*$ that minimizes the cost function:

$$\Delta p^* = \underset{\Delta p}{\operatorname{argmin}} \sum_u [I(R(u, p + \Delta p)) - T(u)]^2$$

For example, a Lucas-Kanade method may be applied.

The value of the optimized motion increment $\Delta p^*$ may be compared to a threshold value $\epsilon$ (block 260). If the value of the optimized motion increment $\Delta p^*$ is sufficiently small and less than the threshold value $\epsilon$, the method may be considered to have converged, and execution of motion estimation method 200 may be ended for the currently selected region of the frame (block 290). Motion estimation method 200 may be repeated (starting from the operation described by block 210) for another region (e.g. an adjacent region) of the input image.

If value of the optimized motion increment $\Delta p^*$ is greater than the threshold value $\epsilon$, the previous values of the motion p may be modified by incrementing by $\Delta p^*$ (block 270):

$$p + \Delta p^* \to p$$

The modified motion p may be projected into the range flow plane (block 280). In this manner, the modified motion may be constrained by the constraint condition.

The motion optimization process may then be repeated for another iteration (returning to block 250) until the iterative process is complete. For example, the iterative process may be complete when the calculated motion increment is small ($\Delta p^* < \epsilon$, block 260) or another criterion is satisfied (e.g. number of iterations greater than maximum allowed number of iterations). Thus, the calculation may yield a motion or an estimated motion of an element of an imaged object of the imaged scene.

The calculated motion for each patch of the image may be converted (e.g. by dividing by a time interval between frames) to a velocity of each element in the image. A velocity of an element of an imaged object may be used, for example, to calculate a time to or until a collision of a vehicle (e.g. in which the system is installed with the imaged object (assuming no change). As a result of the calculated time to collision, a driver of a vehicle may be alerted to the possibility of the collision. For example, an audible alert may be generated. As another example, a velocity of an element may be utilized by an automated collision avoidance device or application to maneuver a vehicle so as to avoid a collision with the object.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
directing modulated light at an object in motion over at least one set time interval;
using a beam splitter to direct a first portion of the modulated light after reflection from the object onto a range imager and a second portion of the modulated light onto an intensity imager so as to generate time-dependent, pixel-specific, intensity data and range data of the object; and
using a processor to:
perform pixel-level fusion of the intensity data and the range data, and
calculate three-dimensional, pixel-level motion flow from the pixel-level fusion of the intensity data and the range data,
wherein the pixel-level fusion is implemented by minimizing $$\sum_u [I(R(u, p + \Delta p)) - T(u)]^2$$

such that pixel motion p is constrained within a planar patch as defined by $$\left[ \frac{\partial_u Z}{\partial_u X} \quad \frac{\partial_v Z}{\partial_v Y} \quad 1 \right] p^T = \Delta_t Z,$$

wherein:
T(u) is previously acquired frame,
I(u) is an input image,
R(u,p) is a warp function describing a motion of image elements between T and I,
u refers to image pixel coordinates in terms of row and column, (u,v),
$p^T$ is motion of image elements between T and I, and
$\Delta p$ is a change in p from a previously calculated value,
$\partial_u Z$ and $\partial_u X$ are range image gradients along pixel row, u,
$\partial_v Z$ and $\partial_v Y$ are range image gradients along pixel column, v,
$\Delta_t Z$ is partial derivative with respect to time, t,
X, Y, Z refers to three-dimensional coordinates of range image expressed in pixel coordinates u, v, and t.

2. A method comprising:
directing modulated light at an object in motion over at least one set time interval;
using a beam splitter to direct a first portion of the modulated light after reflection from the object onto a range imager and a second portion of the modulated light onto an intensity imager so as to generate time-dependent, pixel-specific, intensity data and range data of the object; and
using a processor to:
perform pixel-level fusion of the intensity data and the range data,
calculate three-dimensional, pixel-level motion flow from the pixel-level fusion of the intensity data and the range data,
wherein the pixel-level fusion is implemented by minimizing $$\sum_u [I(R(u, p + \Delta p)) - T(u)]^2$$

such that pixel motion p is constrained within a planar patch as defined by $$\left[\begin{array}{ccc}\frac{\partial_u Z}{\partial_u X} & \frac{\partial_v Z}{\partial_v Y} & 1\end{array}\right]p^T = \Delta_t Z,$$

wherein:
T(u) is previously acquired frame,
I(u) is an input image,
R(u,p) is a warp function describing a motion of image elements between T and I,
u refers to image pixel coordinates in terms of row and column, (u,v),
$p^T$ is motion of image elements between T and I, and
Δp is a change in p from a previously calculated value,
$\partial_u Z$ and $\partial_u X$ are range image gradients along pixel row, u,
$\partial_v Z$ and $\partial_v Y$ are range image gradients along pixel column, v,
$\Delta_t Z$ is partial derivative with respect to time, t,
X, Y, Z refers to three-dimensional coordinates of range image expressed in pixel coordinates u, v, and t, and
wherein the minimizing $$\sum_u [I(R(u, p + \Delta p)) - T(u)]^2$$

is implemented by applying Lucas-Kanade algorithm.

3. A system comprising:
a modulated light source configured to direct modulated light at an object in motion over at least one set time interval;
a beam splitter configured to direct a first portion of the modulated light after reflection from the object onto a range imager detector and a second portion of the modulated light onto an intensity imager detector so as to generate time-dependent, pixel-specific, intensity data and range data of the object; and
a processor configured to:
perform pixel-level fusion of the intensity data and the range data, and
calculate three-dimensional, pixel-level motion flow from the pixel-level fusion of the intensity data and the range data,
the pixel-level fusion is implemented by minimizing $$\sum_u [I(R(u, p + \Delta p)) - T(u)]^2$$

such that pixel motion p is constrained within a planar patch as defined by $$\left[\begin{array}{ccc}\frac{\partial_u Z}{\partial_u X} & \frac{\partial_v Z}{\partial_v Y} & 1\end{array}\right]p^T = \Delta_t Z,$$

wherein:
T(u) is previously acquired frame,
I(u) is an input image,
R(u,p) is a warp function describing a motion of image elements between T and I,
u refers to image pixel coordinates in terms of row and column, (u,v),
$p^T$ is motion of image elements between T and I, and
Δp is a change in p from a previously calculated value,
$\partial_u Z$ and $\partial_u X$ are range image gradients along pixel row, u,
$\partial_v Z$ and $\partial_v Y$ are range image gradients along pixel column, v,
$\Delta_t Z$ is partial derivative with respect to time, t,
X, Y, Z refers to three-dimensional coordinates of range image expressed in pixel coordinates u, v, and t.

4. A system comprising:
a modulated light source configured to direct modulated light at an object in motion over at least one set time interval;
a beam splitter configured to direct a first portion of the modulated light after reflection from the object onto a range imager detector and a second portion of the modulated light onto an intensity imager detector so as to generate time-dependent, pixel-specific, intensity data and range data of the object; and
a processor configured to:
perform pixel-level fusion of the intensity data and the range data, and
calculate three-dimensional, pixel-level motion flow from the pixel-level fusion of the intensity data and the range data, pixel-level fusion is implemented by minimizing $$\sum_u [I(R(u, p + \Delta p)) - T(u)]^2$$

such that pixel motion p is constrained within a planar patch as defined by $$\left[\begin{array}{ccc}\frac{\partial_u Z}{\partial_u X} & \frac{\partial_v Z}{\partial_v Y} & 1\end{array}\right]p^T = \Delta_t Z,$$

wherein:
T(u) is previously acquired frame,
I(u) is an input image,
R(u,p) is a warp function describing a motion of image elements between T and I,
u refers to image pixel coordinates in terms of row and column, (u,v),
$p^T$ is motion of image elements between T and I, and
Δp is a change in p from a previously calculated value,
$\partial_u Z$ and $\partial_u X$ are range image gradients along pixel row, u,
$\partial_v Z$ and $\partial_v Y$ are range image gradients along pixel column, v,
$\Delta_t Z$ is partial derivative with respect to time, t,
X, Y, Z refers to three-dimensional coordinates of range image expressed in pixel coordinates u, v, and t,
wherein the minimizing $$\sum_u [I(R(u, p + \Delta p)) - T(u)]^2$$

is implemented by applying Lucas-Kanade algorithm.

* * * * *